US012359433B2

(12) United States Patent
Lem

(10) Patent No.: US 12,359,433 B2
(45) Date of Patent: Jul. 15, 2025

(54) WALKWAY ROLL

(71) Applicant: BMIC LLC, Dallas, TX (US)

(72) Inventor: Paul Lem, Mountain Lakes, NJ (US)

(73) Assignee: BMIC LLC, Dallas, TX (US)

( * ) Notice: Subject to any disclaimer, the term of this patent is extended or adjusted under 35 U.S.C. 154(b) by 391 days.

(21) Appl. No.: 17/675,709

(22) Filed: Feb. 18, 2022

(65) Prior Publication Data

US 2022/0268026 A1 Aug. 25, 2022

Related U.S. Application Data

(60) Provisional application No. 63/151,388, filed on Feb. 19, 2021.

(51) Int. Cl.
*E04D 5/06* (2006.01)
*C08L 23/02* (2025.01)

(52) U.S. Cl.
CPC ............... *E04D 5/06* (2013.01); *C08L 23/02* (2013.01)

(58) Field of Classification Search
CPC .................... E04D 5/06; C08L 23/02
See application file for complete search history.

(56) References Cited

U.S. PATENT DOCUMENTS

| | | | |
|---|---|---|---|
| 7,741,397 B2 | 6/2010 | Liang et al. | |
| 10,730,223 B2 | 8/2020 | Stoiljkovic et al. | |
| 2015/0176281 A1* | 6/2015 | Yang | D06N 3/0077 428/141 |
| 2018/0023301 A1 | 1/2018 | Wang et al. | |
| 2018/0094439 A1* | 4/2018 | Wang | C08L 23/06 |

FOREIGN PATENT DOCUMENTS

WO 2020163844 A1 8/2020

* cited by examiner

*Primary Examiner* — Alicia J Weydemeyer
*Assistant Examiner* — Laura B Figg
(74) *Attorney, Agent, or Firm* — Venable LLP

(57) ABSTRACT

A walkway roll includes a thermoplastic olefin; and an olefin block copolymer present in an amount of 5 wt. % to 18 wt. % based on a total weight of the walkway roll. The walkway roll includes an embossed region. The embossed region, according to a heat aging test at 275° F. for 37 weeks, shows no cracks.

20 Claims, 3 Drawing Sheets

WALKWAY ROLL

RELATED APPLICATIONS

This application claims priority to U.S. Provisional Application No. 63/151,388, filed on Feb. 19, 2021, and entitled "Walkway Roll," the entire contents of which are hereby incorporated by reference.

FIELD

At least some embodiments disclosed herein relate generally to roofing membranes. More particularly, at least some embodiments disclosed herein relate to walkway rolls including a thermoplastic polyolefin and an olefin block copolymer.

BACKGROUND

Walkway rolls can be used to protect a roofing membrane in areas exposed to rooftop traffic. The walkway rolls are often exposed to a variety of temperatures. At colder temperatures, flexibility can be limited. At higher temperatures, the walkway roll can crack.

SUMMARY

In some embodiments, a pad includes a thermoplastic olefin; and an olefin block copolymer present in an amount of 5 wt. % to 18 wt. % based on a total weight of the pad. In some embodiments, the pad includes an embossed region. In some embodiments, the pad is configured to at least partially cover a roofing membrane. In some embodiments, the embossed region, tested according to a heat aging test at 275° F. for 37 weeks, shows no cracks.

In some embodiments, the thermoplastic olefin is present in an amount of 28 wt. % to 88 wt. % based on the total weight of the pad.

In some embodiments, the embossed region has an average stiffness in a length direction of 140 $S_T$ to 400 $S_T$. In some embodiments, the embossed region has an average stiffness in a width direction of 140 $S_T$ to 350 $S_T$.

In some embodiments, the pad includes a lap weld region. In some embodiments, the lap weld region has an average stiffness in a length direction of 50 $S_T$ to 200 $S_T$. In some embodiments, the lap weld region has an average stiffness in a width direction of 50 $S_T$ to 150 $S_T$. In some embodiments, the lap weld region, tested according to a heat aging test at 275° F. for 37 weeks, shows no cracks.

In some embodiments, the pad includes $CaCO_3$.

In some embodiments, the olefin block copolymer, tested according to ASTM D792, has a density of 0.87 $g/cm^3$ to 0.90 $g/cm^3$.

In some embodiments, the thermoplastic olefin has a melt flow rate, tested according to ASTM D1238, of 0.6 g/10 min to 15 g/10 min, and a density, tested according to ASTM D792, of 0.87 $g/cm^3$ to 0.90 $g/cm^3$.

In some embodiments, a walkway roll includes a thermoplastic olefin; and an olefin block copolymer present in an amount of 5 wt. % to 18 wt. % based on a total weight of the walkway roll. In some embodiments, the walkway roll includes an embossed region. In some embodiments, the embossed region, according to a heat aging test at 275° F. for 37 weeks, shows no cracks.

In some embodiments, the olefin block copolymer is present in an amount of 5 wt. % to 16 wt. % based on the total weight of the walkway roll. In some embodiments, the olefin block copolymer is present in an amount of 8 wt. % to 14 wt. % based on the total weight of the walkway roll.

In some embodiments, the walkway roll includes from 1 wt. % to 50 wt. % $CaCO_3$ based on the total weight of the walkway roll.

In some embodiments, a roofing system includes a roof decking; a roofing membrane on the roof decking; and a walkway roll on the roofing membrane. In some embodiments, the walkway roll includes a thermoplastic olefin; and an olefin block copolymer present in an amount of 5 wt. % to 18 wt. % based on a total weight of the walkway roll. In some embodiments, the walkway roll includes an embossed region. In some embodiments, the embossed region, according to a heat aging test at 275° F. for 37 weeks, shows no cracks.

In some embodiments, the olefin block copolymer has a density, tested according to ASTM D792, of 0.87 $g/cm^3$ to 0.90 $g/cm^3$.

In some embodiments, the thermoplastic olefin has a melt flow rate, tested according to ASTM D1238, of 0.6 g/10 min to 15 g/10 min, and a density, tested according to ASTM D792, of 0.87 $g/cm^3$ to 0.90 $g/cm^3$.

In some embodiments, the walkway roll includes $CaCO_3$.

In some embodiments, the walkway roll includes a lap weld region, wherein the lap weld region, tested according to a heat aging test at 275° F. for 37 weeks, shows no cracks.

BRIEF DESCRIPTION OF THE DRAWINGS

Reference is made to the drawings that form a part of this disclosure, and which illustrate embodiments in which the devices and methods described herein can be practiced.

Like reference numbers represent the same or similar parts throughout.

DETAILED DESCRIPTION

Walkway rolls often include an embossed region having ridges and a lap region that is not embossed. The walkway rolls are often exposed to a variety of temperatures. At colder temperatures, flexibility can be limited. At higher temperatures, the walkway roll can crack.

Embodiments described herein relate to walkway rolls having a thermoplastic polyolefin and an olefin block copolymer. The walkway rolls described herein exhibit improved results when heat aging tested at 275° F. in both an embossed region and a lap weld region of the walkway roll. In some embodiments, the walkway rolls described herein also exhibit improved flexibility at room temperature compared to prior walkway rolls.

Figure 1:
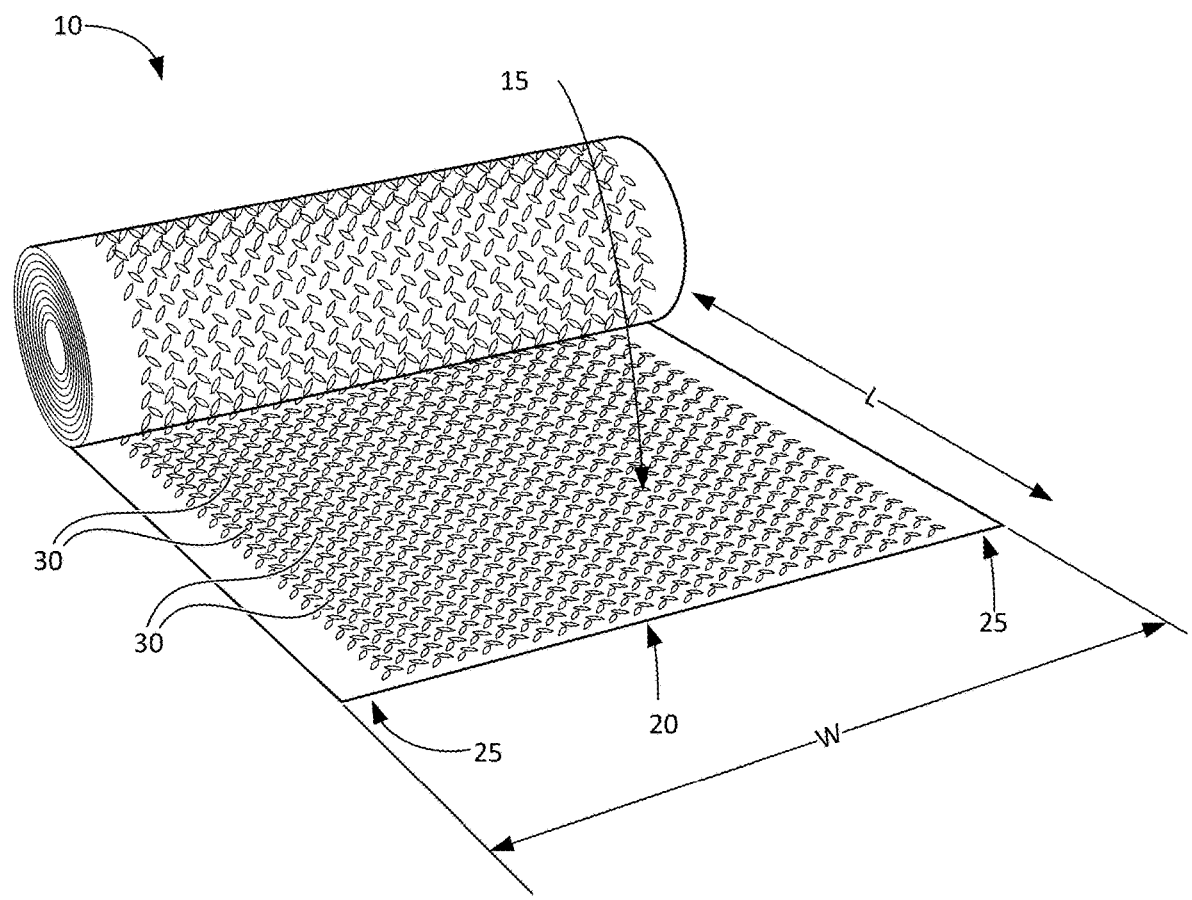
FIG. 1 shows a walkway roll, according to some embodiments.
Figure 2:
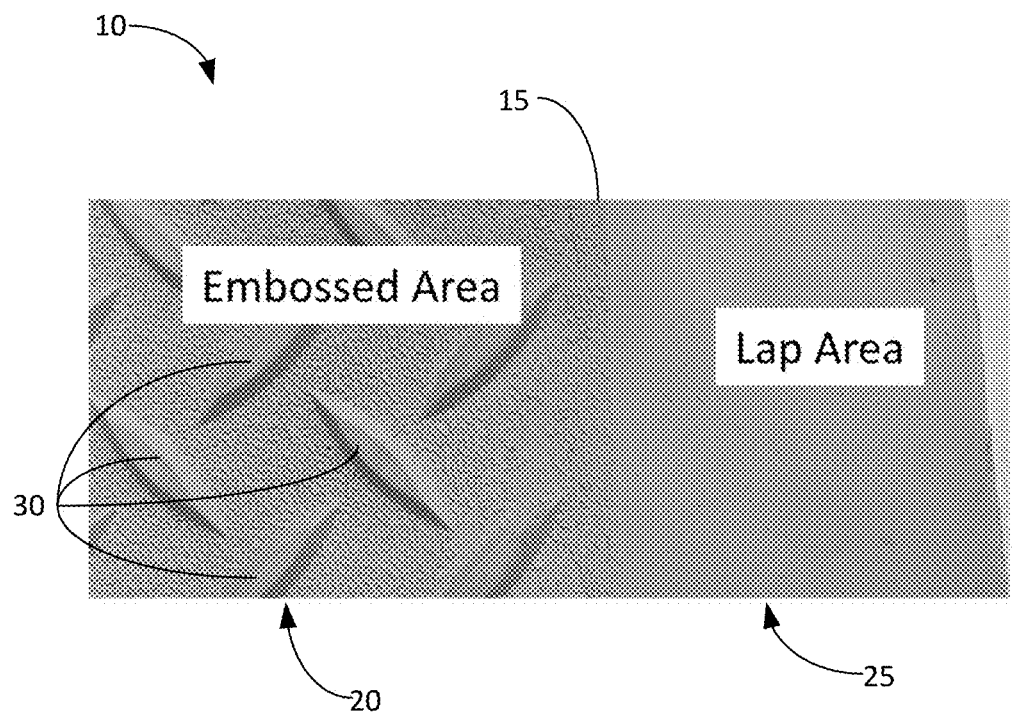
FIG. 2 shows an expanded view of a portion of the walkway roll of FIG. 1, according to some embodiments.

FIG. 1 shows a walkway roll 10, according to some embodiments. FIG. 2 shows an expanded view of a portion of the walkway roll 10, according to some embodiments. Reference will be made generally to FIGS. 1 and 2 unless specifically noted otherwise. In some embodiments, the walkway roll 10 can be disposed on top of a roofing membrane to protect the roofing membrane in areas that are, for example, exposed to foot traffic on a rooftop (e.g., for maintenance access or the like).

In some embodiments, the walkway roll 10 includes a pad 15 that is rolled to form the walkway roll 10. In some embodiments, the pad 15 can have a varying width W based on application. In some embodiments, the pad 15 can be 30 to 38 inches wide. In some embodiments, the pad 15 can be cut down to a particular width based on a user's need. In such embodiments, the pad 15 can have a width that is less than 30 inches wide.

In some embodiments, the pad 15 can have a varying length L. For example, in some embodiments, the pad 15 can be 40 to 60 feet in length, and rolled to form the walkway roll 10. In some embodiments, the walkway roll 10 can include a pad 15 having a length of 40 to 60 feet, but the pad 15 can be cut to a particular length based on a user's needs. In such embodiments, the pad 15 can have a length that is less than 40 feet.

In some embodiments, a thickness of the pad 15 can be from $\frac{1}{16}$ inches to $\frac{1}{4}$ inches.

It is to be appreciated that the above lengths, widths, and thickness are examples, and the actual dimensions of the pad 15 can vary beyond the stated values, according to some embodiments.

The illustrated pad 15 includes an embossed region 20 and a lap weld region 25. In some embodiments, the embossed region 20 includes a plurality of protrusions 30. In some embodiments, the protrusions 30 can have a variety of geometries. In the illustrated embodiment, the protrusions 30 have a diamond-plate arrangement (FIG. 2). In the illustrated embodiment, the embossed region 20 is disposed between lap weld regions 25 in a direction of the width W of the pad 15.

The pad 15 has a stiffness in a direction of the width W and a stiffness in the direction of the length L. The stiffness in the direction of the width W and the stiffness in the direction of the length L can be obtained by flexing the pad 15. The stiffness can be an average stiffness of multiple flexures in different directions (i.e., the direction of the width W or the direction of the length L).

In some embodiments, the embossed region 20 has an average stiffness in the direction of the width W of 140 Tabor Stiffness Units ($S_T$) to 350 $S_T$ at room temperature (72° F.). In some embodiments, the embossed region 20 has an average stiffness in the direction of the width W of 150 $S_T$ to 350 $S_T$ at room temperature (72° F.). In some embodiments, the embossed region 20 has an average stiffness in the direction of the width W of 160 $S_T$ to 350 $S_T$ at room temperature (72° F.). In some embodiments, the embossed region 20 has an average stiffness in the direction of the width W of 170 $S_T$ to 350 $S_T$ at room temperature (72° F.). In some embodiments, the embossed region 20 has an average stiffness in the direction of the width W of 180 $S_T$ to 350 $S_T$ at room temperature (72° F.). In some embodiments, the embossed region 20 has an average stiffness in the direction of the width W of 190 $S_T$ to 350 $S_T$ at room temperature (72° F.). In some embodiments, the embossed region 20 has an average stiffness in the direction of the width W of 200 $S_T$ to 350 $S_T$ at room temperature (72° F.). In some embodiments, the embossed region 20 has an average stiffness in the direction of the width W of 210 $S_T$ to 350 $S_T$ at room temperature (72° F.). In some embodiments, the embossed region 20 has an average stiffness in the direction of the width W of 220 $S_T$ to 350 $S_T$ at room temperature (72° F.). In some embodiments, the embossed region 20 has an average stiffness in the direction of the width W of 230 $S_T$ to 350 $S_T$ at room temperature (72° F.). In some embodiments, the embossed region 20 has an average stiffness in the direction of the width W of 240 $S_T$ to 350 $S_T$ at room temperature (72° F.). In some embodiments, the embossed region 20 has an average stiffness in the direction of the width W of 250 $S_T$ to 350 $S_T$ at room temperature (72° F.). In some embodiments, the embossed region 20 has an average stiffness in the direction of the width W of 260 $S_T$ to 350 $S_T$ at room temperature (72° F.). In some embodiments, the embossed region 20 has an average stiffness in the direction of the width W of 270 $S_T$ to 350 $S_T$ at room temperature (72° F.). In some embodiments, the embossed region 20 has an average stiffness in the direction of the width W of 280 $S_T$ to 350 $S_T$ at room temperature (72° F.). In some embodiments, the embossed region 20 has an average stiffness in the direction of the width W of 290 $S_T$ to 350 $S_T$ at room temperature (72° F.). In some embodiments, the embossed region 20 has an average stiffness in the direction of the width W of 300 $S_T$ to 350 $S_T$ at room temperature (72° F.). In some embodiments, the embossed region 20 has an average stiffness in the direction of the width W of 310 $S_T$ to 350 $S_T$ at room temperature (72° F.). In some embodiments, the embossed region 20 has an average stiffness in the direction of the width W of 320 $S_T$ to 350 $S_T$ at room temperature (72° F.). In some embodiments, the embossed region 20 has an average stiffness in the direction of the width W of 330 $S_T$ to 350 $S_T$ at room temperature (72° F.). In some embodiments, the embossed region 20 has an average stiffness in the direction of the width W of 340 $S_T$ to 350 $S_T$ at room temperature (72° F.).

In some embodiments, the embossed region 20 has an average stiffness in the direction of the width W of 140 $S_T$ to 340 $S_T$ at room temperature (72° F.). In some embodiments, the embossed region 20 has an average stiffness in the direction of the width W of 140 $S_T$ to 330 $S_T$ at room temperature (72° F.). In some embodiments, the embossed region 20 has an average stiffness in the direction of the width W of 140 $S_T$ to 320 $S_T$ at room temperature (72° F.). In some embodiments, the embossed region 20 has an average stiffness in the direction of the width W of 140 $S_T$ to 310 $S_T$ at room temperature (72° F.). In some embodiments, the embossed region 20 has an average stiffness in the direction of the width W of 140 $S_T$ to 300 $S_T$ at room temperature (72° F.). In some embodiments, the embossed region 20 has an average stiffness in the direction of the width W of 140 $S_T$ to 290 $S_T$ at room temperature (72° F.). In some embodiments, the embossed region 20 has an average stiffness in the direction of the width W of 140 $S_T$ to 280 $S_T$ at room temperature (72° F.). In some embodiments, the embossed region 20 has an average stiffness in the direction of the width W of 140 $S_T$ to 270 $S_T$ at room temperature (72° F.). In some embodiments, the embossed region 20 has an average stiffness in the direction of the width W of 140 $S_T$ to 260 $S_T$ at room temperature (72° F.). In some embodiments, the embossed region 20 has an average stiffness in the direction of the width W of 140 $S_T$ to 250 $S_T$ at room temperature (72° F.). In some embodiments, the embossed region 20 has an average stiffness in the direction of the width W of 140 $S_T$ to 240 $S_T$ at room temperature (72° F.). In some embodiments, the embossed region 20 has an average stiffness in the direction of the width W of 140 $S_T$ to 230 $S_T$ at room temperature (72° F.). In some embodiments, the embossed region 20 has an average stiffness in the direction of the width W of 140 $S_T$ to 220 $S_T$ at room temperature (72° F.). In some embodiments, the embossed region 20 has an average stiffness in the direction of the width W of 140 $S_T$ to 210 $S_T$ at room temperature (72° F.). In some embodiments, the embossed region 20 has an average stiffness in the direction of the width W of 140 $S_T$ to 200 $S_T$ at room temperature (72° F.). In some embodiments, the embossed region 20 has an average stiffness in the direction of the width W of 140 $S_T$ to 190 $S_T$ at room temperature (72° F.). In some embodiments, the embossed region 20 has an average stiffness in the direction of the width W of 140 $S_T$ to 180 $S_T$ at room temperature (72° F.). In some embodiments, the embossed region 20 has an average stiffness in the direction of the width W of 140 $S_T$ to 170 $S_T$ at room temperature (72° F.). In some embodiments, the embossed region 20 has an average stiffness in the direction of the width W of 140 $S_T$ to 160 $S_T$ at room temperature (72° F.). In some embodiments, the embossed region 20 has an average stiffness in the direction of the width W of 140 $S_T$ to 150 $S_T$ at room temperature (72° F.).

In some embodiments, the embossed region 20 has an average stiffness in the direction of the length L of 140 $S_T$ to 400 $S_T$ at room temperature (72° F.). In some embodiments, the embossed region 20 has an average stiffness in the direction of the length L of 150 $S_T$ to 400 $S_T$ at room temperature (72° F.). In some embodiments, the embossed region 20 has an average stiffness in the direction of the length L of 160 $S_T$ to 400 $S_T$ at room temperature (72° F.). In some embodiments, the embossed region 20 has an average stiffness in the direction of the length L of 170 $S_T$ to 400 $S_T$ at room temperature (72° F.). In some embodiments, the embossed region 20 has an average stiffness in the direction of the length L of 180 $S_T$ to 400 $S_T$ at room temperature (72° F.). In some embodiments, the embossed region 20 has an average stiffness in the direction of the length L of 190 $S_T$ to 400 $S_T$ at room temperature (72° F.). In some embodiments, the embossed region 20 has an average stiffness in the direction of the length L of 200 $S_T$ to 400 $S_T$ at room temperature (72° F.). In some embodiments, the embossed region 20 has an average stiffness in the direction of the length L of 210 $S_T$ to 400 $S_T$ at room temperature (72° F.). In some embodiments, the embossed region 20 has an average stiffness in the direction of the length L of 220 $S_T$ to 400 $S_T$ at room temperature (72° F.). In some embodiments, the embossed region 20 has an average stiffness in the direction of the length L of 230 $S_T$ to 400 $S_T$ at room temperature (72° F.). In some embodiments, the embossed region 20 has an average stiffness in the direction of the length L of 240 $S_T$ to 400 $S_T$ at room temperature (72° F.). In some embodiments, the embossed region 20 has an average stiffness in the direction of the length L of 250 $S_T$ to 400 $S_T$ at room temperature (72° F.). In some embodiments, the embossed region 20 has an average stiffness in the direction of the length L of 260 $S_T$ to 400 $S_T$ at room temperature (72° F.). In some embodiments, the embossed region 20 has an average stiffness in the direction of the length L of 270 $S_T$ to 400 $S_T$ at room temperature (72° F.). In some embodiments, the embossed region 20 has an average stiffness in the direction of the length L of 280 $S_T$ to 400 $S_T$ at room temperature (72° F.). In some embodiments, the embossed region 20 has an average stiffness in the direction of the length L of 290 $S_T$ to 400 $S_T$ at room temperature (72° F.). In some embodiments, the embossed region 20 has an average stiffness in the direction of the length L of 300 $S_T$ to 400 $S_T$ at room temperature (72° F.). In some embodiments, the embossed region 20 has an average stiffness in the direction of the length L of 310 $S_T$ to 400 $S_T$ at room temperature (72° F.). In some embodiments, the embossed region 20 has an average stiffness in the direction of the length L of 320 $S_T$ to 400 $S_T$ at room temperature (72° F.). In some embodiments, the embossed region 20 has an average stiffness in the direction of the length L of 330 $S_T$ to 400 $S_T$ at room temperature (72° F.). In some embodiments, the embossed region 20 has an average stiffness in the direction of the length L of 340 $S_T$ to 400 $S_T$ at room temperature (72° F.). In some embodiments, the embossed region 20 has an average stiffness in the direction of the length L of 350 $S_T$ to 400 $S_T$ at room temperature (72° F.). In some embodiments, the embossed region 20 has an average stiffness in the direction of the length L of 360 $S_T$ to 400 $S_T$ at room temperature (72° F.). In some embodiments, the embossed region 20 has an average stiffness in the direction of the length L of 370 $S_T$ to 400 $S_T$ at room temperature (72° F.). In some embodiments, the embossed region 20 has an average stiffness in the direction of the length L of 380 $S_T$ to 400 $S_T$ at room temperature (72° F.). In some embodiments, the embossed region 20 has an average stiffness in the direction of the length L of 390 $S_T$ to 400 $S_T$ at room temperature (72° F.).

In some embodiments, the embossed region 20 has an average stiffness in the direction of the length L of 140 $S_T$ to 390 $S_T$ at room temperature (72° F.). In some embodiments, the embossed region 20 has an average stiffness in the direction of the length L of 140 $S_T$ to 380 $S_T$ at room temperature (72° F.). In some embodiments, the embossed region 20 has an average stiffness in the direction of the length L of 140 $S_T$ to 370 $S_T$ at room temperature (72° F.). In some embodiments, the embossed region 20 has an average stiffness in the direction of the length L of 140 $S_T$ to 360 $S_T$ at room temperature (72° F.). In some embodiments, the embossed region 20 has an average stiffness in the direction of the length L of 140 $S_T$ to 350 $S_T$ at room temperature (72° F.). In some embodiments, the embossed region 20 has an average stiffness in the direction of the length L of 140 $S_T$ to 340 $S_T$ at room temperature (72° F.). In some embodiments, the embossed region 20 has an average stiffness in the direction of the length L of 140 $S_T$ to 330 $S_T$ at room temperature (72° F.). In some embodiments, the embossed region 20 has an average stiffness in the direction of the length L of 140 $S_T$ to 320 $S_T$ at room temperature (72° F.). In some embodiments, the embossed region 20 has an average stiffness in the direction of the length L of 140 $S_T$ to 310 $S_T$ at room temperature (72° F.). In some embodiments, the embossed region 20 has an average stiffness in the direction of the length L of 140 $S_T$ to 300 $S_T$ at room temperature (72° F.). In some embodiments, the embossed region 20 has an average stiffness in the direction of the length L of 140 $S_T$ to 290 $S_T$ at room temperature (72° F.). In some embodiments, the embossed region 20 has an average stiffness in the direction of the length L of 140 $S_T$ to 280 $S_T$ at room temperature (72° F.). In some embodiments, the embossed region 20 has an average stiffness in the direction of the length L of 140 $S_T$ to 270 $S_T$ at room temperature (72° F.). In some embodiments, the embossed region 20 has an average stiffness in the direction of the length L of 140 $S_T$ to 260 $S_T$ at room temperature (72° F.). In some embodiments, the embossed region 20 has an average stiffness in the direction of the length L of 140 $S_T$ to 250 $S_T$ at room temperature (72° F.). In some embodiments, the embossed region 20 has an average stiffness in the direction of the length L of 140 $S_T$ to 240 $S_T$ at room temperature (72° F.). In some embodiments, the embossed region 20 has an average stiffness in the direction of the length L of 140 $S_T$ to 230 $S_T$ at room temperature (72° F.). In some embodiments, the embossed region 20 has an average stiffness in the direction of the length L of 140 $S_T$ to 220 $S_T$ at room temperature (72° F.). In some embodiments, the embossed region 20 has an average stiffness in the direction of the length L of 140 $S_T$ to 210 $S_T$ at room temperature (72° F.). In some embodiments, the embossed region 20 has an average stiffness in the direction of the length L of 140 $S_T$ to 200 $S_T$ at room temperature (72° F.). In some embodiments, the embossed region 20 has an average stiffness in the direction of the length L of 140 $S_T$ to 190 $S_T$ at room temperature (72° F.). In some embodiments, the embossed region 20 has an average stiffness in the direction of the length L of 140 $S_T$ to 180 $S_T$ at room temperature (72° F.). In some embodiments, the embossed region 20 has an average stiffness in the direction of the length L of 140 $S_T$ to 170 $S_T$ at room temperature (72° F.). In some embodiments, the embossed region 20 has an average stiffness in the direction of the length L of 140 $S_T$ to 160 $S_T$ at room temperature (72° F.). In some embodiments, the embossed region 20 has an average stiffness in the direction of the length L of 140 $S_T$ to 150 $S_T$ at room temperature (72° F.).

In some embodiments, the lap weld region 25 has an average stiffness in the direction of the width W of 50 $S_T$ to 150 $S_T$ at room temperature (72° F.). In some embodiments, the lap weld region 25 has an average stiffness in the direction of the width W of 60 $S_T$ to 150 $S_T$ at room temperature (72° F.). In some embodiments, the lap weld region 25 has an average stiffness in the direction of the width W of 70 $S_T$ to 150 $S_T$ at room temperature (72° F.). In some embodiments, the lap weld region 25 has an average stiffness in the direction of the width W of 80 $S_T$ to 150 $S_T$ at room temperature (72° F.). In some embodiments, the lap weld region 25 has an average stiffness in the direction of the width W of 90 $S_T$ to 150 $S_T$ at room temperature (72° F.). In some embodiments, the lap weld region 25 has an average stiffness in the direction of the width W of 100 $S_T$ to 150 $S_T$ at room temperature (72° F.). In some embodiments, the lap weld region 25 has an average stiffness in the direction of the width W of 110 $S_T$ to 150 $S_T$ at room temperature (72° F.). In some embodiments, the lap weld region 25 has an average stiffness in the direction of the width W of 120 $S_T$ to 150 $S_T$ at room temperature (72° F.). In some embodiments, the lap weld region 25 has an average stiffness in the direction of the width W of 130 $S_T$ to 150 $S_T$ at room temperature (72° F.). In some embodiments, the lap weld region 25 has an average stiffness in the direction of the width W of 140 $S_T$ to 150 $S_T$ at room temperature (72° F.).

In some embodiments, the lap weld region 25 has an average stiffness in the direction of the width W of 50 $S_T$ to 140 $S_T$ at room temperature (72° F.). In some embodiments, the lap weld region 25 has an average stiffness in the direction of the width W of 50 $S_T$ to 130 $S_T$ at room temperature (72° F.). In some embodiments, the lap weld region 25 has an average stiffness in the direction of the width W of 50 $S_T$ to 120 $S_T$ at room temperature (72° F.). In some embodiments, the lap weld region 25 has an average stiffness in the direction of the width W of 50 $S_T$ to 110 $S_T$ at room temperature (72° F.). In some embodiments, the lap weld region 25 has an average stiffness in the direction of the width W of 50 $S_T$ to 100 $S_T$ at room temperature (72° F.). In some embodiments, the lap weld region 25 has an average stiffness in the direction of the width W of 50 $S_T$ to 90 $S_T$ at room temperature (72° F.). In some embodiments, the lap weld region 25 has an average stiffness in the direction of the width W of 50 $S_T$ to 80 $S_T$ at room temperature (72° F.). In some embodiments, the lap weld region 25 has an average stiffness in the direction of the width W of 50 $S_T$ to 70 $S_T$ at room temperature (72° F.). In some embodiments, the lap weld region 25 has an average stiffness in the direction of the width W of 50 $S_T$ to 60 $S_T$ at room temperature (72° F.

In some embodiments, the lap weld region 25 has an average stiffness in the direction of the length L of 50 $S_T$ to 200 $S_T$ at room temperature (72° F.). In some embodiments, the lap weld region 25 has an average stiffness in the direction of the length L of 60 $S_T$ to 200 $S_T$ at room temperature (72° F.). In some embodiments, the lap weld region 25 has an average stiffness in the direction of the length L of 70 $S_T$ to 200 $S_T$ at room temperature (72° F.). In some embodiments, the lap weld region 25 has an average stiffness in the direction of the length L of 80 $S_T$ to 200 $S_T$ at room temperature (72° F.). In some embodiments, the lap weld region 25 has an average stiffness in the direction of the length L of 90 $S_T$ to 200 $S_T$ at room temperature (72° F.). In some embodiments, the lap weld region 25 has an average stiffness in the direction of the length L of 100 $S_T$ to 200 $S_T$ at room temperature (72° F.). In some embodiments, the lap weld region 25 has an average stiffness in the direction of the length L of 110 $S_T$ to 200 $S_T$ at room temperature (72° F.). In some embodiments, the lap weld region 25 has an average stiffness in the direction of the length L of 120 $S_T$ to 200 $S_T$ at room temperature (72° F.). In some embodiments, the lap weld region 25 has an average stiffness in the direction of the length L of 130 $S_T$ to 200 $S_T$ at room temperature (72° F.). In some embodiments, the lap weld region 25 has an average stiffness in the direction of the length L of 140 $S_T$ to 200 $S_T$ at room temperature (72° F.). In some embodiments, the lap weld region 25 has an average stiffness in the direction of the length L of 150 $S_T$ to 200 $S_T$ at room temperature (72° F.). In some embodiments, the lap weld region 25 has an average stiffness in the direction of the length L of 160 $S_T$ to 200 $S_T$ at room temperature (72° F.). In some embodiments, the lap weld region 25 has an average stiffness in the direction of the length L of 170 $S_T$ to 200 $S_T$ at room temperature (72° F.). In some embodiments, the lap weld region 25 has an average stiffness in the direction of the length L of 180 $S_T$ to 200 $S_T$ at room temperature (72° F.). In some embodiments, the lap weld region 25 has an average stiffness in the direction of the length L of 190 $S_T$ to 200 $S_T$ at room temperature (72° F.).

In some embodiments, the lap weld region 25 has an average stiffness in the direction of the length L of 50 $S_T$ to 190 $S_T$ at room temperature (72° F.). In some embodiments, the lap weld region 25 has an average stiffness in the direction of the length L of 50 $S_T$ to 180 $S_T$ at room temperature (72° F.). In some embodiments, the lap weld region 25 has an average stiffness in the direction of the length L of 50 $S_T$ to 170 $S_T$ at room temperature (72° F.). In some embodiments, the lap weld region 25 has an average stiffness in the direction of the length L of 50 $S_T$ to 160 $S_T$ at room temperature (72° F.). In some embodiments, the lap weld region 25 has an average stiffness in the direction of the length L of 50 $S_T$ to 150 $S_T$ at room temperature (72° F.). In some embodiments, the lap weld region 25 has an average stiffness in the direction of the length L of 50 $S_T$ to 140 $S_T$ at room temperature (72° F.). In some embodiments, the lap weld region 25 has an average stiffness in the direction of the length L of 50 $S_T$ to 130 $S_T$ at room temperature (72° F.). In some embodiments, the lap weld region 25 has an average stiffness in the direction of the length L of 50 $S_T$ to 120 $S_T$ at room temperature (72° F.). In some embodiments, the lap weld region 25 has an average stiffness in the direction of the length L of 50 $S_T$ to 110 $S_T$ at room temperature (72° F.). In some embodiments, the lap weld region 25 has an average stiffness in the direction of the length L of 50 $S_T$ to 100 $S_T$ at room temperature (72° F.). In some embodiments, the lap weld region 25 has an average stiffness in the direction of the length L of 50 $S_T$ to 90 $S_T$ at room temperature (72° F.). In some embodiments, the lap weld region 25 has an average stiffness in the direction of the length L of 50 $S_T$ to 80 $S_T$ at room temperature (72° F.). In some embodiments, the lap weld region 25 has an average stiffness in the direction of the length L of 50 $S_T$ to 70 $S_T$ at room temperature (72° F.). In some embodiments, the lap weld region 25 has an average stiffness in the direction of the length L of 50 $S_T$ to 60 $S_T$ at room temperature (72° F.).

In some embodiments, the embossed region 20 shows no cracks according to a heat aging test at 275° F. for 33 weeks. In some embodiments, the embossed region 20 shows no cracks according to a heat aging test at 275° F. for 34 weeks. In some embodiments, the embossed region 20 shows no cracks according to a heat aging test at 275° F. for 35 weeks. In some embodiments, the embossed region 20 shows no cracks according to a heat aging test at 275° F. for 36 weeks. In some embodiments, the embossed region 20 shows no cracks according to a heat aging test at 275° F. for 37 weeks. In some embodiments, the embossed region 20 shows no cracks according to a heat aging test at 275° F. for 38 weeks. In some embodiments, the embossed region 20 shows no cracks according to a heat aging test at 275° F. for 39 weeks. In some embodiments, the embossed region 20 shows no cracks according to a heat aging test at 275° F. for 40 weeks. In some embodiments, the embossed region 20 shows no cracks according to a heat aging test at 275° F. for 45 weeks. In some embodiments, the embossed region 20 shows no cracks according to a heat aging test at 275° F. for 50 weeks. In some embodiments, the embossed region 20 shows no cracks according to a heat aging test at 275° F. for 52 weeks. In some embodiments, the embossed region 20 shows no cracks according to a heat aging test at 275° F. for 53 weeks. In some embodiments, the embossed region 20 shows no cracks according to a heat aging test at 275° F. for 54 weeks. In some embodiments, the embossed region 20 shows no cracks according to a heat aging test at 275° F. for 55 weeks. In some embodiments, the embossed region 20 shows no cracks according to a heat aging test at 275° F. for 56 weeks. In some embodiments, the embossed region 20 shows no cracks according to a heat aging test at 275° F. for 57 weeks. In some embodiments, the embossed region 20 shows no cracks according to a heat aging test at 275° F. for 58 weeks. In some embodiments, the embossed region 20 shows no cracks according to a heat aging test at 275° F. for 59 weeks. In some embodiments, the embossed region 20 shows no cracks according to a heat aging test at 275° F. for 60 weeks. In some embodiments, the embossed region 20 shows no cracks according to a heat aging test at 275° F. for 61 weeks. In some embodiments, the embossed region 20 shows no cracks according to a heat aging test at 275° F. for 62 weeks. In some embodiments, the embossed region 20 shows no cracks according to a heat aging test at 275° F. for 63 weeks. In some embodiments, the embossed region 20 shows no cracks according to a heat aging test at 275° F. for 64 weeks. In some embodiments, the embossed region 20 shows no cracks according to a heat aging test at 275° F. for 65 weeks. In some embodiments, the embossed region 20 shows no cracks according to a heat aging test at 275° F. for 66 weeks. In some embodiments, the embossed region 20 shows no cracks according to a heat aging test at 275° F. for 67 weeks. In some embodiments, the embossed region 20 shows no cracks according to a heat aging test at 275° F. for 68 weeks. In some embodiments, the embossed region 20 shows no cracks according to a heat aging test at 275° F. for 69 weeks. In some embodiments, the embossed region 20 shows no cracks according to a heat aging test at 275° F. for 70 weeks. In some embodiments, the embossed region 20 shows no cracks according to a heat aging test at 275° F. for 71 weeks. In some embodiments, the embossed region 20 shows no cracks according to a heat aging test at 275° F. for 72 weeks. In some embodiments, the embossed region 20 shows no cracks according to a heat aging test at 275° F. for 73 weeks. In some embodiments, the embossed region 20 shows no cracks according to a heat aging test at 275° F. for 74 weeks. In some embodiments, the embossed region 20 shows no cracks according to a heat aging test at 275° F. for 75 weeks. In some embodiments, the embossed region 20 shows no cracks according to a heat aging test at 275° F. for 76 weeks. In some embodiments, the embossed region 20 shows no cracks according to a heat aging test at 275° F. for 77 weeks. In some embodiments, the embossed region 20 shows no cracks according to a heat aging test at 275° F. for 78 weeks. In some embodiments, the embossed region 20 shows no cracks according to a heat aging test at 275° F. for 79 weeks. In some embodiments, the embossed region 20 shows no cracks according to a heat aging test at 275° F. for 80 weeks. In some embodiments, the embossed region 20 shows no cracks according to a heat aging test at 275° F. for 81 weeks. In some embodiments, the embossed region 20 shows no cracks according to a heat aging test at 275° F. for 82 weeks. In some embodiments, the embossed region 20 shows no cracks according to a heat aging test at 275° F. for 83 weeks. In some embodiments, the embossed region 20 shows no cracks according to a heat aging test at 275° F. for 84 weeks. In some embodiments, the embossed region 20 shows no cracks according to a heat aging test at 275° F. for 85 weeks. In some embodiments, the embossed region 20 shows no cracks according to a heat aging test at 275° F. for 86 weeks. In some embodiments, the embossed region 20 shows no cracks according to a heat aging test at 275° F. for 87 weeks. In some embodiments, the embossed region 20 shows no cracks according to a heat aging test at 275° F. for 88 weeks. In some embodiments, the embossed region 20 shows no cracks according to a heat aging test at 275° F. for 89 weeks.

In some embodiments, the lap weld region 25 shows no cracks according to a heat aging test at 275° F. for 33 weeks. In some embodiments, the lap weld region 25 shows no cracks according to a heat aging test at 275° F. for 34 weeks. In some embodiments, the lap weld region 25 shows no cracks w according to a heat aging test at 275° F. for 35 weeks. In some embodiments, the lap weld region 25 shows no cracks according to a heat aging test at 275° F. for 36 weeks. In some embodiments, the lap weld region 25 shows no cracks according to a heat aging test at 275° F. for 37 weeks. In some embodiments, the lap weld region 25 shows no cracks according to a heat aging test at 275° F. for 38 weeks. In some embodiments, the lap weld region 25 shows no cracks according to a heat aging test at 275° F. for 39 weeks. In some embodiments, the lap weld region 25 shows no cracks according to a heat aging test at 275° F. for 40 weeks. In some embodiments, the lap weld region 25 shows no cracks according to a heat aging test at 275° F. for 45 weeks. In some embodiments, the lap weld region 25 shows no cracks according to a heat aging test at 275° F. for 50 weeks. In some embodiments, the lap weld region 25 shows no cracks according to a heat aging test at 275° F. for 52 weeks. In some embodiments, the lap weld region 25 shows no cracks according to a heat aging test at 275° F. for 53 weeks. In some embodiments, the lap weld region 25 shows no cracks according to a heat aging test at 275° F. for 54 weeks. In some embodiments, the lap weld region 25 shows no cracks according to a heat aging test at 275° F. for 55 weeks. In some embodiments, the lap weld region 25 shows no cracks according to a heat aging test at 275° F. for 56 weeks. In some embodiments, the lap weld region 25 shows no cracks according to a heat aging test at 275° F. for 57 weeks. In some embodiments, the lap weld region 25 shows no cracks according to a heat aging test at 275° F. for 58 weeks. In some embodiments, the lap weld region 25 shows no cracks according to a heat aging test at 275° F. for 59 weeks. In some embodiments, the lap weld region 25 shows no cracks according to a heat aging test at 275° F. for 60 weeks. In some embodiments, the lap weld region 25 shows no cracks according to a heat aging test at 275° F. for 61 weeks. In some embodiments, the lap weld region 25 shows no cracks according to a heat aging test at 275° F. for 62 weeks. In some embodiments, the lap weld region 25 shows no cracks according to a heat aging test at 275° F. for 63 weeks. In some embodiments, the lap weld region 25 shows no cracks according to a heat aging test at 275° F. for 64 weeks. In some embodiments, the lap weld region 25 shows no cracks according to a heat aging test at 275° F. for 65 weeks. In some embodiments, the lap weld region 25 shows no cracks according to a heat aging test at 275° F. for 66 weeks. In some embodiments, the lap weld region 25 shows no cracks according to a heat aging test at 275° F. for 67 weeks. In some embodiments, the lap weld region 25 shows no cracks according to a heat aging test at 275° F. for 68 weeks. In some embodiments, the lap weld region 25 shows no cracks according to a heat aging test at 275° F. for 69 weeks. In some embodiments, the lap weld region 25 shows no cracks according to a heat aging test at 275° F. for 70 weeks. In some embodiments, the lap weld region 25 shows no cracks according to a heat aging test at 275° F. for 71 weeks. In some embodiments, the lap weld region 25 shows no cracks according to a heat aging test at 275° F. for 72 weeks. In some embodiments, the lap weld region 25 shows no cracks according to a heat aging test at 275° F. for 73 weeks. In some embodiments, the lap weld region 25 shows no cracks according to a heat aging test at 275° F. for 74 weeks. In some embodiments, the lap weld region 25 shows no cracks according to a heat aging test at 275° F. for 75 weeks. In some embodiments, the lap weld region 25 shows no cracks according to a heat aging test at 275° F. for 76 weeks. In some embodiments, the lap weld region 25 shows no cracks according to a heat aging test at 275° F. for 77 weeks. In some embodiments, the lap weld region 25 shows no cracks according to a heat aging test at 275° F. for 78 weeks. In some embodiments, the lap weld region 25 shows no cracks according to a heat aging test at 275° F. for 79 weeks. In some embodiments, the lap weld region 25 shows no cracks according to a heat aging test at 275° F. for 80 weeks. In some embodiments, the lap weld region 25 shows no cracks according to a heat aging test at 275° F. for 81 weeks. In some embodiments, the lap weld region 25 shows no cracks according to a heat aging test at 275° F. for 82 weeks. In some embodiments, the lap weld region 25 shows no cracks according to a heat aging test at 275° F. for 83 weeks. In some embodiments, the lap weld region 25 shows no cracks according to a heat aging test at 275° F. for 84 weeks. In some embodiments, the lap weld region 25 shows no cracks according to a heat aging test at 275° F. for 85 weeks. In some embodiments, the lap weld region 25 shows no cracks according to a heat aging test at 275° F. for 86 weeks. In some embodiments, the lap weld region 25 shows no cracks according to a heat aging test at 275° F. for 87 weeks. In some embodiments, the lap weld region 25 shows no cracks according to a heat aging test at 275° F. for 88 weeks. In some embodiments, the lap weld region 25 shows no cracks according to a heat aging test at 275° F. for 89 weeks. In some embodiments, the lap weld region 25 shows no cracks according to a heat aging test at 275° F. for 90 weeks. In some embodiments, the lap weld region 25 shows no cracks according to a heat aging test at 275° F. for 91 weeks. In some embodiments, the lap weld region 25 shows no cracks according to a heat aging test at 275° F. for 92 weeks. In some embodiments, the lap weld region 25 shows no cracks according to a heat aging test at 275° F. for 93 weeks. In some embodiments, the lap weld region 25 shows no cracks according to a heat aging test at 275° F. for 94 weeks. In some embodiments, the lap weld region 25 shows no cracks according to a heat aging test at 275° F. for 95 weeks. In some embodiments, the lap weld region 25 shows no cracks according to a heat aging test at 275° F. for 96 weeks. In some embodiments, the lap weld region 25 shows no cracks according to a heat aging test at 275° F. for 97 weeks. In some embodiments, the lap weld region 25 shows no cracks according to a heat aging test at 275° F. for 98 weeks. In some embodiments, the lap weld region 25 shows no cracks according to a heat aging test at 275° F. for 99 weeks. In some embodiments, the lap weld region 25 shows no cracks according to a heat aging test at 275° F. for 100 weeks. In some embodiments, the lap weld region 25 shows no cracks according to a heat aging test at 275° F. for 101 weeks. In some embodiments, the lap weld region 25 shows no cracks according to a heat aging test at 275° F. for 102 weeks. In some embodiments, the lap weld region 25 shows no cracks according to a heat aging test at 275° F. for 103 weeks. In some embodiments, the lap weld region 25 shows no cracks according to a heat aging test at 275° F. for 104 weeks. In some embodiments, the lap weld region 25 shows no cracks according to a heat aging test at 275° F. for 105 weeks.

"Heat aging testing at 275° F." includes aging a sample of a pad in an oven at 275° F. The sample size is 1 inch by 2.78 inches. Once per week, the sample of the pad is taken out of the oven, cooled, and bent over a 3-inch diameter mandrel. Under a 7× microscope, the sample of the pad is checked for cracks. If the sample of the pad does not show any cracks, the sample of the pad is placed back into the oven and tested again the next week. If the sample of the pad shows a crack, the current week number is identified as the result for the sample of the pad.

The pad 15 is composed of a thermoplastic olefin and an olefin block copolymer.

In some embodiments, the thermoplastic olefin has a density of 0.87 g/cm$^3$ to 0.90 g/cm$^3$ when tested according to ASTM D792. In some embodiments, the thermoplastic olefin has a density of 0.88 g/cm$^3$ to 0.90 g/cm$^3$ when tested according to ASTM D792. In some embodiments, the thermoplastic olefin has a density of 0.89 g/cm$^3$ to 0.90 g/cm$^3$ when tested according to ASTM D792. In some embodiments, the thermoplastic olefin has a density of 0.87 g/cm$^3$ to 0.89 g/cm$^3$ when tested according to ASTM D792. In some embodiments, the thermoplastic olefin has a density of 0.87 g/cm$^3$ to 0.88 g/cm$^3$ when tested according to ASTM D792.

In some embodiments, the thermoplastic olefin has a melt flow rate of 0.6 g/10 min to 15 g/10 min when tested according to ASTM D1238. In some embodiments, the thermoplastic olefin has a melt flow rate of 1 g/10 min to 15 g/10 min when tested according to ASTM D1238. In some embodiments, the thermoplastic olefin has a melt flow rate of 2 g/10 min to 15 g/10 min when tested according to ASTM D1238. In some embodiments, the thermoplastic olefin has a melt flow rate of 3 g/10 min to 15 g/10 min when tested according to ASTM D1238. In some embodiments, the thermoplastic olefin has a melt flow rate of 4 g/10 min to 15 g/10 min when tested according to ASTM D1238. In some embodiments, the thermoplastic olefin has a melt flow rate of 5 g/10 min to 15 g/10 min when tested according to ASTM D1238. In some embodiments, the thermoplastic olefin has a melt flow rate of 6 g/10 min to 15 g/10 min when tested according to ASTM D1238. In some embodiments, the thermoplastic olefin has a melt flow rate of 7 g/10 min to 15 g/10 min when tested according to ASTM D1238. In some embodiments, the thermoplastic olefin has a melt flow rate of 8 g/10 min to 15 g/10 min when tested according to ASTM D1238. In some embodiments, the thermoplastic olefin has a melt flow rate of 9 g/10 min to 15 g/10 min when tested according to ASTM D1238. In some embodiments, the thermoplastic olefin has a melt flow rate of 10 g/10 min to 15 g/10 min when tested according to ASTM D1238. In some embodiments, the thermoplastic olefin has a melt flow rate of 11 g/10 min to 15 g/10 min when tested according to ASTM D1238. In some embodiments, the thermoplastic olefin has a melt flow rate of 12 g/10 min to 15 g/10 min when tested according to ASTM D1238. In some embodiments, the thermoplastic olefin has a melt flow rate of 13 g/10 min to 15 g/10 min when tested according to ASTM D1238. In some embodiments, the thermoplastic olefin has a melt flow rate of 14 g/10 min to 15 g/10 min when tested according to ASTM D1238.

In some embodiments, the thermoplastic olefin has a melt flow rate of 0.6 g/10 min to 14 g/10 min when tested according to ASTM D1238. In some embodiments, the thermoplastic olefin has a melt flow rate of 0.6 g/10 min to 13 g/10 min when tested according to ASTM D1238. In some embodiments, the thermoplastic olefin has a melt flow rate of 0.6 g/10 min to 12 g/10 min when tested according to ASTM D1238. In some embodiments, the thermoplastic olefin has a melt flow rate of 0.6 g/10 min to 11 g/10 min when tested according to ASTM D1238. In some embodiments, the thermoplastic olefin has a melt flow rate of 0.6 g/10 min to 10 g/10 min when tested according to ASTM D1238. In some embodiments, the thermoplastic olefin has a melt flow rate of 0.6 g/10 min to 9 g/10 min when tested according to ASTM D1238. In some embodiments, the thermoplastic olefin has a melt flow rate of 0.6 g/10 min to 8 g/10 min when tested according to ASTM D1238. In some embodiments, the thermoplastic olefin has a melt flow rate of 0.6 g/10 min to 7 g/10 min when tested according to ASTM D1238. In some embodiments, the thermoplastic olefin has a melt flow rate of 0.6 g/10 min to 6 g/10 min when tested according to ASTM D1238. In some embodiments, the thermoplastic olefin has a melt flow rate of 0.6 g/10 min to 5 g/10 min when tested according to ASTM D1238. In some embodiments, the thermoplastic olefin has a melt flow rate of 0.6 g/10 min to 4 g/10 min when tested according to ASTM D1238. In some embodiments, the thermoplastic olefin has a melt flow rate of 0.6 g/10 min to 3 g/10 min when tested according to ASTM D1238. In some embodiments, the thermoplastic olefin has a melt flow rate of 0.6 g/10 min to 2 g/10 min when tested according to ASTM D1238. In some embodiments, the thermoplastic olefin has a melt flow rate of 0.6 g/10 min to 1 g/10 min when tested according to ASTM D1238.

In some embodiments, the olefin block copolymer has a density of 0.87 g/cm$^3$ to 0.90 g/cm$^3$ when tested according to ASTM D792. In some embodiments, the olefin block copolymer has a density of 0.88 g/cm$^3$ to 0.90 g/cm$^3$ when tested according to ASTM D792. In some embodiments, the olefin block copolymer has a density of 0.89 g/cm$^3$ to 0.90 g/cm$^3$ when tested according to ASTM D792. In some embodiments, the olefin block copolymer has a density of 0.87 g/cm$^3$ to 0.89 g/cm$^3$ when tested according to ASTM D792. In some embodiments, the olefin block copolymer has a density of 0.87 g/cm$^3$ to 0.88 g/cm$^3$ when tested according to ASTM D792.

In some embodiments, the olefin block copolymer has a melt flow rate of 0.5 g/10 min to 10 g/10 min when tested according to ASTM D1238. In some embodiments, the olefin block copolymer has a melt flow rate of 1 g/10 min to 10 g/10 min when tested according to ASTM D1238. In some embodiments, the olefin block copolymer has a melt flow rate of 2 g/10 min to 10 g/10 min when tested according to ASTM D1238. In some embodiments, the olefin block copolymer has a melt flow rate of 3 g/10 min to 10 g/10 min when tested according to ASTM D1238. In some embodiments, the olefin block copolymer has a melt flow rate of 4 g/10 min to 10 g/10 min when tested according to ASTM D1238. In some embodiments, the olefin block copolymer has a melt flow rate of 5 g/10 min to 10 g/10 min when tested according to ASTM D1238. In some embodiments, the olefin block copolymer has a melt flow rate of 6 g/10 min to 10 g/10 min when tested according to ASTM D1238. In some embodiments, the olefin block copolymer has a melt flow rate of 7 g/10 min to 10 g/10 min when tested according to ASTM D1238. In some embodiments, the olefin block copolymer has a melt flow rate of 8 g/10 min to 10 g/10 min when tested according to ASTM D1238. In some embodiments, the olefin block copolymer has a melt flow rate of 9 g/10 min to 10 g/10 min when tested according to ASTM D1238.

In some embodiments, the olefin block copolymer has a melt flow rate of 0.5 g/10 min to 9 g/10 min when tested according to ASTM D1238. In some embodiments, the olefin block copolymer has a melt flow rate of 0.5 g/10 min to 8 g/10 min when tested according to ASTM D1238. In some embodiments, the olefin block copolymer has a melt flow rate of 0.5 g/10 min to 7 g/10 min when tested according to ASTM D1238. In some embodiments, the olefin block copolymer has a melt flow rate of 0.5 g/10 min to 6 g/10 min when tested according to ASTM D1238. In some embodiments, the olefin block copolymer has a melt flow rate of 0.5 g/10 min to 5 g/10 min when tested according to ASTM D1238. In some embodiments, the olefin block copolymer has a melt flow rate of 0.5 g/10 min to 4 g/10 min when tested according to ASTM D1238. In some embodiments, the olefin block copolymer has a melt flow rate of 0.5 g/10 min to 3 g/10 min when tested according to ASTM D1238. In some embodiments, the olefin block copolymer has a melt flow rate of 0.5 g/10 min to 2 g/10 min when tested according to ASTM D1238. In some embodiments, the olefin block copolymer has a melt flow rate of 0.5 g/10 min to 1 g/10 min when tested according to ASTM D1238.

In some embodiments, the thermoplastic olefin is present in an amount of 28 wt. % to 88 wt. % based on a total weight of the pad 15. In some embodiments, the thermoplastic olefin is present in an amount of 30 wt. % to 88 wt. % based on a total weight of the pad 15. In some embodiments, the thermoplastic olefin is present in an amount of 32 wt. % to 88 wt. % based on a total weight of the pad 15. In some embodiments, the thermoplastic olefin is present in an amount of 34 wt. % to 88 wt. % based on a total weight of the pad 15. In some embodiments, the thermoplastic olefin is present in an amount of 36 wt. % to 88 wt. % based on a total weight of the pad 15. In some embodiments, the thermoplastic olefin is present in an amount of 38 wt. % to 88 wt. % based on a total weight of the pad 15. In some embodiments, the thermoplastic olefin is present in an amount of 40 wt. % to 88 wt. % based on a total weight of the pad 15. In some embodiments, the thermoplastic olefin is present in an amount of 42 wt. % to 88 wt. % based on a total weight of the pad 15. In some embodiments, the thermoplastic olefin is present in an amount of 44 wt. % to 88 wt. % based on a total weight of the pad 15. In some embodiments, the thermoplastic olefin is present in an amount of 46 wt. % to 88 wt. % based on a total weight of the pad 15. In some embodiments, the thermoplastic olefin is present in an amount of 48 wt. % to 88 wt. % based on a total weight of the pad 15. In some embodiments, the thermoplastic olefin is present in an amount of 50 wt. % to 88 wt. % based on a total weight of the pad 15. In some embodiments, the thermoplastic olefin is present in an amount of 52 wt. % to 88 wt. % based on a total weight of the pad 15. In some embodiments, the thermoplastic olefin is present in an amount of 54 wt. % to 88 wt. % based on a total weight of the pad 15. In some embodiments, the thermoplastic olefin is present in an amount of 56 wt. % to 88 wt. % based on a total weight of the pad 15. In some embodiments, the thermoplastic olefin is present in an amount of 58 wt. % to 88 wt. % based on a total weight of the pad 15. In some embodiments, the thermoplastic olefin is present in an amount of 60 wt. % to 88 wt. % based on a total weight of the pad 15. In some embodiments, the thermoplastic olefin is present in an amount of 62 wt. % to 88 wt. % based on a total weight of the pad 15. In some embodiments, the thermoplastic olefin is present in an amount of 64 wt. % to 88 wt. % based on a total weight of the pad 15. In some embodiments, the thermoplastic olefin is present in an amount of 66 wt. % to 88 wt. % based on a total weight of the pad 15. In some embodiments, the thermoplastic olefin is present in an amount of 68 wt. % to 88 wt. % based on a total weight of the pad 15. In some embodiments, the thermoplastic olefin is present in an amount of 70 wt. % to 88 wt. % based on a total weight of the pad 15. In some embodiments, the thermoplastic olefin is present in an amount of 72 wt. % to 88 wt. % based on a total weight of the pad 15. In some embodiments, the thermoplastic olefin is present in an amount of 74 wt. % to 88 wt. % based on a total weight of the pad 15. In some embodiments, the thermoplastic olefin is present in an amount of 76 wt. % to 88 wt. % based on a total weight of the pad 15. In some embodiments, the thermoplastic olefin is present in an amount of 78 wt. % to 88 wt. % based on a total weight of the pad 15. In some embodiments, the thermoplastic olefin is present in an amount of 80 wt. % to 88 wt. % based on a total weight of the pad 15. In some embodiments, the thermoplastic olefin is present in an amount of 82 wt. % to 88 wt. % based on a total weight of the pad 15. In some embodiments, the thermoplastic olefin is present in an amount of 84 wt. % to 88 wt. % based on a total weight of the pad 15. In some embodiments, the thermoplastic olefin is present in an amount of 86 wt. % to 88 wt. % based on a total weight of the pad 15.

In some embodiments, the thermoplastic olefin is present in an amount of 28 wt. % to 86 wt. % based on a total weight of the pad 15. In some embodiments, the thermoplastic olefin is present in an amount of 28 wt. % to 84 wt. % based on a total weight of the pad 15. In some embodiments, the thermoplastic olefin is present in an amount of 28 wt. % to 82 wt. % based on a total weight of the pad 15. In some embodiments, the thermoplastic olefin is present in an amount of 28 wt. % to 80 wt. % based on a total weight of the pad 15. In some embodiments, the thermoplastic olefin is present in an amount of 28 wt. % to 78 wt. % based on a total weight of the pad 15. In some embodiments, the thermoplastic olefin is present in an amount of 28 wt. % to 76 wt. % based on a total weight of the pad 15. In some embodiments, the thermoplastic olefin is present in an amount of 28 wt. % to 74 wt. % based on a total weight of the pad 15. In some embodiments, the thermoplastic olefin is present in an amount of 28 wt. % to 72 wt. % based on a total weight of the pad 15. In some embodiments, the thermoplastic olefin is present in an amount of 28 wt. % to 70 wt. % based on a total weight of the pad 15. In some embodiments, the thermoplastic olefin is present in an amount of 28 wt. % to 68 wt. % based on a total weight of the pad 15. In some embodiments, the thermoplastic olefin is present in an amount of 28 wt. % to 66 wt. % based on a total weight of the pad 15. In some embodiments, the thermoplastic olefin is present in an amount of 28 wt. % to 64 wt. % based on a total weight of the pad 15. In some embodiments, the thermoplastic olefin is present in an amount of 28 wt. % to 62 wt. % based on a total weight of the pad 15. In some embodiments, the thermoplastic olefin is present in an amount of 28 wt. % to 60 wt. % based on a total weight of the pad 15. In some embodiments, the thermoplastic olefin is present in an amount of 28 wt. % to 58 wt. % based on a total weight of the pad 15. In some embodiments, the thermoplastic olefin is present in an amount of 28 wt. % to 56 wt. % based on a total weight of the pad 15. In some embodiments, the thermoplastic olefin is present in an amount of 28 wt. % to 54 wt. % based on a total weight of the pad 15. In some embodiments, the thermoplastic olefin is present in an amount of 28 wt. % to 52 wt. % based on a total weight of the pad 15. In some embodiments, the thermoplastic olefin is present in an amount of 28 wt. % to 50 wt. % based on a total weight of the pad 15. In some embodiments, the thermoplastic olefin is present in an amount of 28 wt. % to 48 wt. % based on a total weight of the pad 15. In some embodiments, the thermoplastic olefin is present in an amount of 28 wt. % to 46 wt. % based on a total weight of the pad 15. In some embodiments, the thermoplastic olefin is present in an amount of 28 wt. % to 44 wt. % based on a total weight of the pad 15. In some embodiments, the thermoplastic olefin is present in an amount of 28 wt. % to 42 wt. % based on a total weight of the pad 15. In some embodiments, the thermoplastic olefin is present in an amount of 28 wt. % to 40 wt. % based on a total weight of the pad 15. In some embodiments, the thermoplastic olefin is present in an amount of 28 wt. % to 38 wt. % based on a total weight of the pad 15. In some embodiments, the thermoplastic olefin is present in an amount of 28 wt. % to 36 wt. % based on a total weight of the pad 15. In some embodiments, the thermoplastic olefin is present in an amount of 28 wt. % to 34 wt. % based on a total weight of the pad 15. In some embodiments, the thermoplastic olefin is present in an amount of 28 wt. % to 32 wt. % based on a total weight of the pad 15. In some embodiments, the thermoplastic olefin is present in an amount of 28 wt. % to 30 wt. % based on a total weight of the pad 15.

In some embodiments, the olefin block copolymer is present in an amount of 5 wt. % to 18 wt. % based on a total weight of the pad 15. In some embodiments, the olefin block copolymer is present in an amount of 6 wt. % to 18 wt. % based on a total weight of the pad 15. In some embodiments, the olefin block copolymer is present in an amount of 7 wt. % to 18 wt. % based on a total weight of the pad 15. In some embodiments, the olefin block copolymer is present in an amount from 8 wt. % to 18 wt. % based on a total weight of the pad 15. In some embodiments, the olefin block copolymer is present in an amount of 9 wt. % to 18 wt. % based on a total weight of the pad 15. In some embodiments, the olefin block copolymer is present in an amount of 10 wt. % to 18 wt. % based on a total weight of the pad 15. In some embodiments, the olefin block copolymer is present in an amount of 11 wt. % to 18 wt. % based on a total weight of the pad 15. In some embodiments, the olefin block copolymer is present in an amount of 12 wt. % to 18 wt. % based on a total weight of the pad 15. In some embodiments, the olefin block copolymer is present in an amount of 13 wt. % to 18 wt. % based on a total weight of the pad 15. In some embodiments, the olefin block copolymer is present in an amount of 14 wt. % to 18 wt. % based on a total weight of the pad 15. In some embodiments, the olefin block copolymer is present in an amount of 15 wt. % to 18 wt. % based on a total weight of the pad 15. In some embodiments, the olefin block copolymer is present in an amount of 16 wt. % to 18 wt. % based on a total weight of the pad 15. In some embodiments, the olefin block copolymer is present in an amount of 17 wt. % to 18 wt. % based on a total weight of the pad 15.

In some embodiments, the olefin block copolymer is present in an amount of 5 wt. % to 17 wt. % based on a total weight of the pad 15. In some embodiments, the olefin block copolymer is present in an amount of 5 wt. % to 16 wt. % based on a total weight of the pad 15. In some embodiments, the olefin block copolymer is present in an amount of 5 wt. % to 15 wt. % based on a total weight of the pad 15. In some embodiments, the olefin block copolymer is present in an amount of 5 wt. % to 14 wt. % based on a total weight of the pad 15. In some embodiments, the olefin block copolymer is present in an amount of 5 wt. % to 13 wt. % based on a total weight of the pad 15. In some embodiments, the olefin block copolymer is present in an amount of 5 wt. % to 12 wt. % based on a total weight of the pad 15. In some embodiments, the olefin block copolymer is present in an amount of 5 wt. % to 11 wt. % based on a total weight of the pad 15. In some embodiments, the olefin block copolymer is present in an amount of 5 wt. % to 10 wt. % based on a total weight of the pad 15. In some embodiments, the olefin block copolymer is present in an amount of 5 wt. % to 9 wt. % based on a total weight of the pad 15. In some embodiments, the olefin block copolymer is present in an amount of 5 wt. % to 8 wt. % based on a total weight of the pad 15. In some embodiments, the olefin block copolymer is present in an amount of 5 wt. % to 7 wt. % based on a total weight of the pad 15. In some embodiments, the olefin block copolymer is present in an amount of 5 wt. % to 6 wt. % based on a total weight of the pad 15.

In some embodiments, the pad 15 further includes $CaCO_3$. In some embodiments, $CaCO_3$ is not present in the pad 15.

In some embodiments, the $CaCO_3$ is present in an amount of 1 wt. % to 50 wt. % based on a total weight of the walkway roll. In some embodiments, the $CaCO_3$ is present in an amount of 2 wt. % to 50 wt. % based on a total weight of the walkway roll. In some embodiments, the $CaCO_3$ is present in an amount of 3 wt. % to 50 wt. % based on a total weight of the walkway roll. In some embodiments, the $CaCO_3$ is present in an amount of 4 wt. % to 50 wt. % based on a total weight of the walkway roll. In some embodiments, the $CaCO_3$ is present in an amount of 5 wt. % to 50 wt. % based on a total weight of the walkway roll. In some embodiments, the $CaCO_3$ is present in an amount of 6 wt. % to 50 wt. % based on a total weight of the walkway roll. In some embodiments, the $CaCO_3$ is present in an amount of 7 wt. % to 50 wt. % based on a total weight of the walkway roll. In some embodiments, the $CaCO_3$ is present in an amount of 8 wt. % to 50 wt. % based on a total weight of the walkway roll. In some embodiments, the $CaCO_3$ is present in an amount of 9 wt. % to 50 wt. % based on a total weight of the walkway roll. In some embodiments, the $CaCO_3$ is present in an amount of 10 wt. % to 50 wt. % based on a total weight of the walkway roll. In some embodiments, the $CaCO_3$ is present in an amount of 15 wt. % to 50 wt. % based on a total weight of the walkway roll. In some embodiments, the $CaCO_3$ is present in an amount of 20 wt. % to 50 wt. % based on a total weight of the walkway roll. In some embodiments, the $CaCO_3$ is present in an amount of 25 wt. % to 50 wt. % based on a total weight of the walkway roll. In some embodiments, the $CaCO_3$ is present in an amount of 30 wt. % to 50 wt. % based on a total weight of the walkway roll. In some embodiments, the $CaCO_3$ is present in an amount of 35 wt. % to 50 wt. % based on a total weight of the walkway roll. In some embodiments, the $CaCO_3$ is present in an amount of 40 wt. % to 50 wt. % based on a total weight of the walkway roll. In some embodiments, the $CaCO_3$ is present in an amount of 45 wt. % to 50 wt. % based on a total weight of the walkway roll.

In some embodiments, the $CaCO_3$ is present in an amount of 1 wt. % to 45 wt. % based on a total weight of the walkway roll. In some embodiments, the $CaCO_3$ is present in an amount of 1 wt. % to 40 wt. % based on a total weight of the walkway roll. In some embodiments, the $CaCO_3$ is present in an amount of 1 wt. % to 35 wt. % based on a total weight of the walkway roll. In some embodiments, the $CaCO_3$ is present in an amount of 1 wt. % to 30 wt. % based on a total weight of the walkway roll. In some embodiments, the $CaCO_3$ is present in an amount of 1 wt. % to 25 wt. % based on a total weight of the walkway roll. In some embodiments, the $CaCO_3$ is present in an amount of 1 wt. % to 20 wt. % based on a total weight of the walkway roll. In some embodiments, the $CaCO_3$ is present in an amount of 1 wt. % to 15 wt. % based on a total weight of the walkway roll. In some embodiments, the $CaCO_3$ is present in an amount of 1 wt. % to 10 wt. % based on a total weight of the walkway roll. In some embodiments, the $CaCO_3$ is present in an amount of 1 wt. % to 9 wt. % based on a total weight of the walkway roll. In some embodiments, the $CaCO_3$ is present in an amount of 1 wt. % to 8 wt. % based on a total weight of the walkway roll. In some embodiments, the $CaCO_3$ is present in an amount of 1 wt. % to 7 wt. % based on a total weight of the walkway roll. In some embodiments, the $CaCO_3$ is present in an amount of 1 wt. % to 6 wt. % based on a total weight of the walkway roll. In some embodiments, the $CaCO_3$ is present in an amount of 1 wt. % to 5 wt. % based on a total weight of the walkway roll. In some embodiments, the $CaCO_3$ is present in an amount of 1 wt. % to 4 wt. % based on a total weight of the walkway roll. In some embodiments, the $CaCO_3$ is present in an amount of 1 wt. % to 3 wt. % based on a total weight of the walkway roll. In some embodiments, the $CaCO_3$ is present in an amount of 1 wt. % to 2 wt. % based on a total weight of the walkway roll.

In some embodiments, one or more additional additives may be included in the pad 15 such as, but not limited to, colorants or the like.

Figure 3:
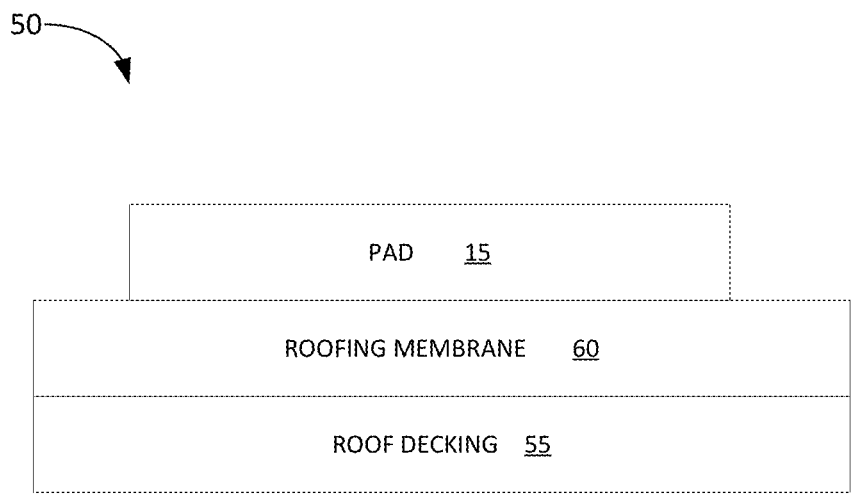
FIG. 3 shows a roofing system, according to some embodiments.

FIG. 3 shows a side schematic view of a roofing system 50, according to some embodiments. The roofing system 50 includes a roof decking 55 (e.g., plywood, metal, polyisocyanurate with coverboard (e.g., gypsum, gypsum fiberboard, wood fiberboard, combinations thereof, or the like), isocyanate with coverboard (e.g., gypsum, gypsum fiberboard, wood fiberboard, combinations thereof, or the like), combinations thereof, or the like). The roof decking 55 can include additional components such as, but not limited to, an underlayment, a vapor barrier, or any combination thereof. In the illustrated embodiment, a roofing membrane 60, such as a thermoplastic olefin (TPO) roofing membrane, is disposed on the roof decking 55. The pad 15 (FIG. 1) is disposed on the roofing membrane 60 so that the pad 15 at least partially covers the roofing membrane 60 to form a walkway. An amount of coverage of the roofing membrane 60 will depend upon an amount of foot traffic on the roofing system 50. For example, in areas having more equipment (e.g., heating, ventilation, air conditioning, and refrigeration (HVACR) equipment or the like), the amount of coverage may be greater relative to areas having less equipment due to the possible need for walking on the roofing system 50 to access the equipment. For simplicity of this Specification, the pad 15 and the walkway roll 10 will not be re-described. It is to be appreciated that the schematic is an example to show the layering of the roof decking 55, the roofing membrane 60, and the pad 15.

NON-LIMITING EXAMPLES

Table 1 below shows compositions of two comparative examples and an example walkway roll 10 according to the discussion herein.

TABLE 1

| Formulation of Walkway Rolls | Comparative Example 1 | Example 1 |
|---|---|---|
| Olefin Block Copolymer | 0 wt. % | 14 wt. % |
| Thermoplastic Olefin | 54 wt. % | 32 wt. % |

Table 2 shows test results for Comparative Example 1 and Example 1 for heat aging tests in the embossed and lap weld regions at 275° F. As described above in accordance with FIG. 1, heat aging tests include aging a sample in an oven at 275° F. Every week, the sample is taken out, cooled and checked for cracks by bending the sample over a mandrel. If the sample shows no cracks, it is placed back into the oven.

TABLE 2

|  | Unit | Comparative Example 1 | Example 1 |
|---|---|---|---|
| Heat Aging at 275° F. (Embossed) | weeks | 5 | 87-89 |
| Heat Aging at 275° F. (Lap-weld) | weeks | 24-29 | 105 |

As can be seen in Table 2, Comparative Example 1 showed cracks in the embossed region in the heat aging test at 275° F. after just 5 weeks and in the lap weld region after just 24-29 weeks. Conversely, Example 1 has showed no cracks in the embossed region until 87-89 weeks and the lap weld region until 105 weeks.

Table 3 shows flexibility of the comparative example and the inventive example in both the embossed and lap weld regions.

TABLE 3

| Walkway Roll | Room Temperature Average Flexibility (Tabor Stiffness Units ($S_T$)) – Direction of width W | Room Temperature Average Flexibility (Tabor Stiffness Units ($S_T$)) – Direction of length L |
|---|---|---|
| Comparative Example 1 (Embossed) | 382-486 | 370-476 |
| Comparative Example 1 (Lap Weld) | 193-278 | 162-268 |
| Example 1 (Embossed) | 140-350 | 140-400 |
| Example 1 (Lap Weld) | 50-150 | 50-200 |

Example 1 shows an improved flexibility at room temperature in both the embossed region and the lap weld region.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. A pad of a walkway roll having an upper surface and a lower surface, the pad comprising:
   a thermoplastic olefin; and
   an olefin block copolymer present in an amount of 5 wt. % to 18 wt. % based on a total weight of the pad,
   wherein at least the upper surface of the pad comprises (i) an embossed region, wherein the embossed region, tested according to a heat aging test at 275° F. for 37 weeks, shows no cracks, and (ii) at least one lap weld region that is not embossed, wherein the at least one lap weld region is configured to be attached to a thermoplastic roofing membrane,
   wherein the pad is configured to protect and to at least partially cover the thermoplastic roofing membrane, such that the lower surface of the pad is configured to attach to an upper surface of the thermoplastic roofing membrane, and
   wherein, when the lower surface of the pad is attached to the upper surface of the thermoplastic roofing membrane, the embossed region is provided on the upper surface of the pad and is configured to be exposed to foot traffic on a roof.

2. The pad of claim 1, wherein the thermoplastic olefin is present in an amount of 28 wt. % to 88 wt. % based on the total weight of the pad.

3. The pad of claim 1, wherein the embossed region has an average stiffness in a length direction of 140 $S_T$ to 400 $S_T$.

4. The pad of claim 1, wherein the embossed region has an average stiffness in a width direction of 140 $S_T$ to 350 $S_T$.

5. The pad of claim 1, wherein the embossed region is disposed between a pair of lap weld regions.

6. The pad of claim 1, wherein the at least one lap weld region has an average stiffness in a length direction of 50 $S_T$ to 200 $S_T$.

7. The pad of claim 1, wherein the at least one lap weld region has an average stiffness in a width direction of 50 $S_T$ to 150 $S_T$.

8. The pad of claim 1, wherein the at least one lap weld region, tested according to a heat aging test at 275° F. for 37 weeks, shows no cracks.

9. The pad of claim 1, comprising $CaCO_3$.

10. The pad of claim 1, wherein the olefin block copolymer, tested according to ASTM D792, has a density of 0.87 g/cm³ to 0.90 g/cm³.

11. The pad of claim 1, wherein the thermoplastic olefin has a melt flow rate, tested according to ASTM D1238, of 0.6 g/10 min to 15 g/10 min, and a density, tested according to ASTM D792, of 0.87 g/cm³ to 0.90 g/cm³.

12. A walkway roll having an upper surface and a lower surface, the walkway roll comprising:
a thermoplastic olefin; and
an olefin block copolymer present in an amount of 5 wt. % to 18 wt. % based on a total weight of the walkway roll,
wherein at least the upper surface of the walkway roll comprises (i) an embossed region, wherein the embossed region, tested according to a heat aging test at 275° F. for 37 weeks, shows no cracks, and (ii) at least one lap weld region that is not embossed, wherein the at least one lap weld region is configured to be attached to a thermoplastic roofing membrane,
wherein the lower surface of the walkway roll is configured to attach to an upper surface of the thermoplastic roofing membrane, and
wherein, when the lower surface of the walkway roll is attached to the upper surface of the thermoplastic roofing membrane, the embossed region is provided on the upper surface of the walkway roll and is configured to be exposed to foot traffic on a roof.

13. The walkway roll of claim 12, wherein the olefin block copolymer is present in an amount of 5 wt. % to 16 wt. % based on the total weight of the walkway roll.

14. The walkway roll of claim 12, wherein the olefin block copolymer is present in an amount of 8 wt. % to 14 wt. % based on the total weight of the walkway roll.

15. The walkway roll of claim 12, comprising from 1 wt. % to 50 wt. % $CaCO_3$ based on the total weight of the walkway roll.

16. A roofing system, comprising:
a roof decking;
a thermoplastic roofing membrane on an upper surface of the roof decking; and
a walkway roll on an upper surface of the thermoplastic roofing membrane, the walkway roll having an upper surface and a lower surface, and the walkway roll comprising:
a thermoplastic olefin; and
an olefin block copolymer present in an amount of 5 wt. % to 18 wt. % based on a total weight of the walkway roll,
wherein at least the upper surface of the walkway roll comprises (i) an embossed region, wherein the embossed region, tested according to a heat aging test at 275° F. for 37 weeks, shows no cracks, and (ii) at least one lap weld region that is not embossed, wherein the walkway roll is attached to the thermoplastic roofing membrane along the at least one lap weld region,
wherein the lower surface of the walkway roll is attached to the upper surface of the thermoplastic roofing membrane, such that the embossed region is provided on the upper surface of the walkway roll and is configured to be exposed to foot traffic on a roof.

17. The roofing system of claim 16, wherein the olefin block copolymer has a density, tested according to ASTM D792, of 0.87 g/cm³ to 0.90 g/cm³.

18. The roofing system of claim 16, wherein the thermoplastic olefin has a melt flow rate, tested according to ASTM D1238, of 0.6 g/10 min to 15 g/10 min, and a density, tested according to ASTM D792, of 0.87 g/cm³ to 0.90 g/cm³.

19. The roofing system of claim 16, wherein the walkway roll comprises $CaCO_3$.

20. The roofing system of claim 16, wherein the at least one lap weld region, tested according to a heat aging test at 275° F. for 37 weeks, shows no cracks.

* * * * *